UNITED STATES PATENT OFFICE.

JOHN JEFFERSON GRAY, JR., OF ROCKDALE, TENNESSEE.

PROCESS OF PRODUCING FERROPHOSPHORUS FROM NELSONITE.

1,216,306. Specification of Letters Patent. Patented Feb. 20, 1917.

No Drawing. Application filed June 26, 1916. Serial No. 106,006.

*To all whom it may concern:*

Be it known that I, JOHN JEFFERSON GRAY, Jr., a citizen of the United States, residing at Rockdale, in the county of Maury and State of Tennessee, have invented certain new and useful Improvements in Processes of Producing Ferrophosphorus from Nelsonite; and I do hereby declare the following to be a full, clear, and exact description of the invention, such as will enable others skilled in the art to which it appertains to make and use the same.

This invention relates to processes for producing ferro-phosphorus from the mineral known as nelsonite, and has for its object to provide a process of this nature which will be efficient in action and certain in its operation, when applied to this refractory ore.

With these and other objects in view the invention consists in the novel steps and combinations of steps constituting the process all as will be more fully hereinafter disclosed and particularly pointed out in the claims.

In order that the invention may be the more clearly understood it is said:—

In my prior Patent #831427, dated September 18, 1906, and entitled Manufacture of ferro-phosphorus, I have referred to various prior processes and have also disclosed a blast furnace method of producing ferro-phosphorus from natural phosphate rock. This invention differs from that of said prior patent in that it utilizes a very refractory ore which heretofore has been considered unfit for the production of ferro-phosphorus and it further involves manipulations not required in said patent, all as will presently appear.

In carrying out the process I take the ore known as nelsonite which at present is considered too refractory and otherwise unfit for the making of ferro-phosphorus, and smelt the same in a blast furnace. An analysis of nelsonite shows it to consist of a mixture of iron oxids ($Fe_2O_3$); tricalcium phosphate $Ca_3P_2O_8$; magnesium phosphate $Mg_3P_2O_8$; silica $SiO_2$; aluminum oxid $Al_2O_3$; potassium oxid $K_2O$; and titanium oxid $TiO_2$ in varying proportions, but often up to 20% of the whole. In making a furnace charge from this ore I add such quantities of silica, tri-basic phosphate and iron oxid as may be at times necessary to neutralize the basic or acid radicles present in the nelsonite, or to increase the phosphorus content of the finished product but I do not flux the titanium oxid $TiO_2$ as an acid, all as will presently appear.

Notwithstanding the very refractory nature of nelsonite for the production of ferrophosphorus, I have discovered by smelting it in a blast furnace along with carbonaceous materials such as coke or charcoal, supplying the right proportions of air (preferably preheated), maintaining at all times a deoxidizing atmosphere of carbon monoxid CO and the presence of incandescent carbon, that with the assistance of small added quantities of tribasic phosphate, silica or iron oxid and not treating the $TiO_2$ as an acid, the said nelsonite will flux itself; and I have further discovered that under such conditions if the temperatures in the furnace are properly controlled, the physical and chemical changes will be so controlled that phosphids of iron or ferro-phosphorus will be the main solid end product, along with slags carrying calcium, silicon, titanium, aluminum, magnesium and potassium, but containing more or less phosphorus.

The proportions of the added materials as well as their nature will of course vary with the analysis of the nelsonite, as will be readily understood. It is important that the temperature be kept constant and at the right point, so that complete chemical control of the reactions may be had at all times. In making ferro-phosphorus from a refractory ore of this kind, what is technically known as "dirty hearth" trouble is often encountered, but I further find that this trouble may be avoided by either running the furnace on, or introducing into the furnace at proper periods, charges containing an excess of phosphate rock and silica, which are immediately followed by charges of iron ore, limestone and coke. The effect of this procedure is as follows:—

The excess of phosphate prevents any ferro-phosphorus present from being reduced, by the iron ore charges, and the latter effectually clean up any left over material from other charges, thus leaving clean hearths, while at the same time avoiding a material reduction in the output of ferro-phosphorus.

I have found that in the smelting of nelsonite, the highest efficiency is attained together with the lowest fuel consumption when the raw materials are charged uniformly and in such physical and mechanical conditions as to insure a proper contact with, and a free passage of the furnace gases. Finely divided ores and materials are objectionable, as in other processes, because too large a quantity of the charge is carried over with the exit gases, and because such finely divided ores also stop up the interstices of the charge, and thereby force the gases to form channels which preclude chemical reactions between the gases and the ores of the stock, and defeat an indirect reduction of the iron ores which is so important in this process.

In addition to the above as is well known, finely divided materials also adhere to the walls of the furnace thus causing scaffolding, hanging and slipping, and thus resulting in loss and troubles in the operations of the furnace. On the other hand, in carrying out this process, with nelsonite, large lumps are likewise to be avoided because they reach the melting zone imperfectly preheated and therefore insufficiently reduced.

In smelting a very refractory charge such as nelsonite, for ferro-phosphorus, one is compelled to form the mixture from ores derived from deposits and beds of widely diversified kinds, and therefore, all sorts of troubles are likely to result unless care is taken to grade the same to the mechanical and physical requirements of the process. If this is done I have found that it can be used in the manufacture of ferro-phosphorus, and that a maximum efficiency can be had if there is secured an intimate mixture, a perfect contact between the iron and phosphorus, a free passage of the gases, and a freedom from scaffolding, etc.

After the furnace is running care must be taken to see that the top temperature does not get so high as to prohibit or curtail the formation of $CO_2$ gas from the deoxidizing of the iron and the $P_2O_5$ vapor present for otherwise, the $P_2O_5$ will waste owing to a want of iron. In other words, the reduction of $P_2O_5$ to elemental phosphorus is necessary before it will combine with the iron; and further if the $P_2O_5$ is deoxidized while the iron oxid is not, the phosphorus vapors will not combine with the oxid but will pass to waste out of the furnace with the gases. This matter of top temperature control is quite important, because elemental phosphorus vapors will combine with the reduced iron when the latter is no hotter than a cherry red or at say 288° C., and therefore it is very important in carrying out this process that the iron be reduced by what is known as an indirect reduction as high up in the furnace stack as is possible. The phosphorus vapors on the other hand, are in most part the product of a direct reduction low down in the furnace, and therefore the necessity for a proper contact, or an opportunity for the phosphorus vapors to react on the reduced iron is evident.

The air admitted to the fusion zone and the bottom temperatures should be so controlled that this reaction will take place all the way from the melting zone to the top of the furnace or as high up as the temperature of 288° C. is maintained.

It is a well known fact that a high top temperature in pig iron manufacture will defeat or curtail the indirect reduction of the iron and of course, if it were desired to pass elemental phosphorus by this process out of the furnace, high top temperatures would be maintained, but in this process no elemental phosphorus is desired to be produced, and therefore the top temperature should not exceed say 288° C.

As a usual thing, in prior charges, the aluminum oxid acts as an acid and about satisfies itself with the calcium oxid present. But sometimes the phosphate rock in prior charges is abnormally high in calcium, and therefore silica has to be added to keep the slag from containing too much lime. These conditions of course, cause one to carry more dead material through the furnace than is necessary in the present process, and this results in a decreased production and a high fuel cost. The same objections obtain when the aluminum oxid in the ore is so high that lime has to be added to keep the slag from being too acid.

Pig iron manufacturers as is well known, usually flux aluminum oxid as an acid along with the silica; they simply add the requisite quantities of limestone. They do not have to depend upon, and provide for the neutralization of the varying calcium compounds that are usually carried by the phosphate rock, as is the case in the present process.

A specific example of a charge of nelsonite is as follows:—

| | | |
|---|---|---|
| Air | | 14720 lbs. |
| Nelsonite: | | |
| $TiO_2$ | 600 lbs. | |
| $Ca_3P_2O_8$ | 1050 | |
| $Mg_3P_2O_8$ | 60 | |
| $Fe_2O_3$ | 750 | |
| $SiO_2$ | 300 | |
| $Al_2O_3$ | 150 | |
| $K_2O$ | 90 | |
| Total | | 3000 " |
| Silica, quartz or feldspar, ($SiO_2$) | | 346 " |
| Neutral phosphate | | 94 " |
| Coke | | 1840 " |
| Total | | 20000 " |

When the above charge of nelsonite is smelted the silica, $SiO_2$ attacks the tribasic phosphates, $Ca_3P_2O_8$ and $Mg_3P_2O_8$ at about 1100° C. combines with the lime or calcium oxid CaO, and magnesium oxid MgO, to form $CaSiO_3$ and $MgSiO_3$. This reaction liberates phosphoric anhydrid, $P_2O_5$, the reactions being complete at about 1400° C. By direct and indirect reduction the $P_2O_5$ is then reduced to elemental phosphorus vapors by the carbon and carbon monoxid CO present. The phosphorus vapors next combine with the iron Fe wherever they come in contact with the same from the top to the bottom of the furnace, to form $Fe_3P$, $Fe_2P$ and FeP, which as a mixture of alloys make ferro-phosphorus. Preheated air and coke are used in quantities necessary to produce the proper heat and maintain the required deoxidizing atmosphere. Heretofore, in blast furnace practice any $TiO_2$ present has been treated as an acid and fluxed with three-fourths as much basic material as is generally used to flux $SiO_2$; but in carrying out this process I find its acidity to be more apparent than real, as it does not combine with the base used to flux it, although it has great power to produce fluidity in the slag. In blast furnace practice it is good practice to add a base to flux the $TiO_2$ present, but I must in this process handle it in another way, for since the $TiO_2$ present does not combine with a basic flux, the $SiO_2$ present would attack the added base instead of the tribasic phosphate, and the desired $P_2O_5$ as a consequence would not be liberated.

Stated in still other language, since titanium oxid has heretofore been treated as an acid in processes analogous to mine, such large quantities of said oxid as occur in nelsonite would naturally lead the furnace man to attempt to flux it with correspondingly large quantities of basic material, or about as much basic material as would be required for the same large amount of silica. But since in this process the $TiO_2$ does not really combine with the basic material, such large quantities of said basic material if added would not only be a useless expense but would require more coke in the charge and would otherwise lower the efficiency of the process. Accordingly, it is an important feature of my invention that I omit any basic material to flux the $TiO_2$ present. On the other hand, I employ, when desired, an excess of tricalcium phosphate to neutralize the fluidity of the slag that is caused by the presence of such a large quantity of $TiO_2$ in the furnace.

Accordingly, I may either run on a fluid slag, or else counteract the fluidity the $TiO_2$ produces by the use of tricalcium phosphate in excess of what the silica will take care of. When I employ an excess of phosphate such a procedure decreases the fluidity of the slag without increasing the burden of material as much as would lime, even if I could use it. In such case the $TiO_2$ does not combine with any of the elements in the charge, but passes off with the $CaSiO_3$ to the slag mass. The carbon, air, oxygen of reduced compounds together with a little potassium, K, some waste phosphorus and $P_2O_5$ constitute the gases.

It will be understood of course, that when the iron ore charges above mentioned are employed to prevent the trouble known as "dirty hearth" the operation of producing ferro-phosphorus is not interrupted. In other words, the extra iron that is charged into the furnace is provided with sufficient phosphorus to form ferro-phosphorus by debris left over in the furnace, by the preceding charges of phosphate ore. It will further be understood that in practice it has been found that these iron ore charges help in stopping the waste of phosphorus at the top of the furnace and they also aid in improving the slag as well as cleaning out the debris at the bottom of the furnace.

Again the carbonate of calcium of the iron ore charges improves the slag by reducing its acidity, and as said iron ore charges come at intervals between the phosphate charges, or the intervals between the charges of silica, they do not seriously interfere with the actions between the said silica and the tricalcium phosphate of the phosphate rock.

It is obvious that those skilled in the art may vary the details of the process without departing from the spirit of the invention and therefore, I do not wish to be limited to the above disclosure except as may be required by the claims.

What is claimed is:—

1. The process of making ferro-phosphorus from nelsonite in a blast furnace which consists in providing a suitable charge of carbon and nelsonite ore containing iron oxid, phosphatic constituents and titanium oxid; adding suitable fluxing material sufficient for the unsatisfied phosphatic constituents, but insufficient for the titanium oxid present; and maintaining in the furnace a reducing atmosphere, substantially as described.

2. The process of making ferro-phosphorus from nelsonite in a blast furnace which consists in providing a suitable charge of carbon and nelsonite containing tricalcium phosphate and iron oxid; fluxing said nelsonite by adding suitable quantities of silica and phosphatic material; so regulating the temperatures that a maximum of iron oxid will suffer indirect reduction, and a maximum of tricalcium phosphate will suffer direct reduction, substantially as described.

3. The process of making ferro-phosphorus from nelsonite in a blast furnace which consists in providing a suitable charge of carbon and nelsonite containing a phosphate and iron oxid; fluxing said nelsonite by adding silica and a phosphatic ore; providing a substantially constant temperature in the furnace adapted to cause a maximum of said iron oxid to suffer indirect reduction and a maximum of said phosphate to suffer a direct reduction; and maintaining a reducing atmosphere in said furnace, substantially as described.

4. The process of preventing the trouble known as "dirty hearth" while making ferro-phosphorus from nelsonite ore in a blast furnace which consists in providing a charge of containing carbon and nelsonite ore containing tricalcium phosphate and iron oxid; adding phosphatic material and silica in excess; fluxing and smelting said charge and immediately following said charge by a charge of iron ore, basic material and coke, substantially as described.

5. The process of making ferro-phosphorus from nelsonite in a blast furnace which consists in providing a suitable charge of carbon and nelsonite ore containing tricalcium phosphate, iron oxid, titanium oxid, and aluminum oxid; fluxing the constituents of said nelsonite, except its titanium oxid by adding a quantity of silica which when combined with the aluminum oxid present will be sufficient to balance the other acids and bases present; and maintaining a reducing atmosphere throughout the furnace, substantially as described.

6. The process of making ferro-phosphorus from nelsonite in a blast furnace which consists in providing a suitable charge of carbon and nelsonite ore containing a phosphate, iron oxid, aluminum oxid and titanium oxid; fluxing said nelsonite ore by adding a quantity of silica and a phosphatic ore sufficient to balance the bases and acids of the constituents except the said titanium oxid; providing a substantially constant temperature in the furnace; maintaining a top temperature of the furnace not above 350° C.; and maintaining a reducing atmosphere throughout said furnace, substantially as described.

7. The process of making ferro-phosphorus from nelsonite in a blast furnace which consists in providing a suitable charge of carbon and nelsonite ore containing iron oxid, phosphatic constituents, and titanium oxid; adding suitable fluxing material sufficient for the unsatisfied phosphatic constituents, but insufficient for the titanium oxid present; adding an excess of tribasic phosphate to counteract the fluidity of the slag caused by the presence of said titanium oxid; and maintaining in the furnace a reducing atmosphere, substantially as described.

In testimony whereof I affix my signature, in presence of two witnesses.

JOHN JEFFERSON GRAY, Jr.

Witnesses:
HYLEMAN A. WEBSTER,
T. J. TIDWELL.